(12) United States Patent
Bishop

(10) Patent No.: US 11,433,263 B1
(45) Date of Patent: Sep. 6, 2022

(54) STRUCTURE CLIMBING SAFETY DEVICE

(71) Applicant: Jerry Bishop, Boonville, IN (US)

(72) Inventor: Jerry Bishop, Boonville, IN (US)

( * ) Notice: Subject to any disclaimer, the term of this patent is extended or adjusted under 35 U.S.C. 154(b) by 654 days.

(21) Appl. No.: 16/442,125

(22) Filed: Jun. 14, 2019

Related U.S. Application Data

(60) Provisional application No. 62/684,783, filed on Jun. 14, 2018.

(51) Int. Cl.
*A62B 35/00* (2006.01)
*G08B 21/02* (2006.01)
*F16B 45/02* (2006.01)

(52) U.S. Cl.
CPC ...... *A62B 35/0037* (2013.01); *A62B 35/0018* (2013.01); *F16B 45/02* (2013.01); *G08B 21/02* (2013.01)

(58) Field of Classification Search
CPC ............ A62B 35/0037; A62B 35/0018; A62B 35/0087; F16B 45/02; G08B 21/02; A63B 29/02
See application file for complete search history.

(56) References Cited

U.S. PATENT DOCUMENTS

| | | | | |
|---|---|---|---|---|
| 4,423,796 A * | 1/1984 | Sulowski | .................. | E06C 7/18 182/8 |
| 5,735,025 A * | 4/1998 | Bailey | ..................... | F16B 45/02 24/600.1 |
| 7,437,806 B2 * | 10/2008 | Lin | ........................ | F16B 45/02 24/600.1 |
| 9,032,595 B2 * | 5/2015 | Lin | ........................... | B66C 1/36 24/600.1 |
| 9,091,295 B1 * | 7/2015 | Yang | .................. | A62B 35/0037 |
| 9,174,072 B2 * | 11/2015 | Strasser | .............. | E04G 21/3295 |
| 9,199,105 B1 * | 12/2015 | Hung | ...................... | F16B 45/04 |
| 9,322,428 B2 * | 4/2016 | Perner | ..................... | F16B 45/02 |
| 9,500,221 B2 * | 11/2016 | Yang | ....................... | F16B 45/02 |
| 9,707,419 B2 * | 7/2017 | Perner | ................ | A62B 35/0037 |
| 9,885,379 B1 * | 2/2018 | Hung | ...................... | F16B 45/02 |
| 10,041,526 B2 * | 8/2018 | Canfield | ............... | F16G 11/143 |
| 10,066,660 B2 * | 9/2018 | Henn | ....................... | F16B 45/02 |
| 10,092,784 B2 * | 10/2018 | Dehondt | ............ | A62B 35/0037 |
| 10,173,085 B2 * | 1/2019 | Dehondt | ................ | A63B 29/02 |

(Continued)

FOREIGN PATENT DOCUMENTS

| | | | | |
|---|---|---|---|---|
| CA | 2866076 A1 * | 4/2015 | ............. | F16B 45/02 |
| WO | WO-2021090225 A1 * | 5/2021 | | |
| WO | WO-2022009175 A1 * | 1/2022 | | |

*Primary Examiner* — Johnnie A. Shablack
(74) *Attorney, Agent, or Firm* — Gary K. Price

(57) ABSTRACT

A safety device comprising a support harness that includes at least one safety cable, and preferably a pair of safety cables. The end of the safety cable has a snap hook designed to releasably connect to the structure. In application, the safety harness is worn by the worker and as the worker ascends or descends the structure, the worker continuously releases and then connects one of the snap hooks to the structure such that at least one safety cable is connected to the structure at all times. The safety harness includes sensors for detecting whether the worker is ascending or descending the structure, for detecting whether at least one of the snap hooks are connected to the structure, and detecting when the worker is attempting to open the snap hook.

17 Claims, 9 Drawing Sheets

(56) References Cited

U.S. PATENT DOCUMENTS

| | | | | |
|---|---|---|---|---|
| 10,173,699 | B2* | 1/2019 | Cylvick | F16D 63/008 |
| 10,496,045 | B2* | 12/2019 | Hu | G05B 9/02 |
| 11,035,155 | B2* | 6/2021 | Fox, Jr. | E05B 81/14 |
| 11,260,252 | B2* | 3/2022 | Blackford | F03G 5/04 |
| 2006/0102423 | A1* | 5/2006 | Lang | A62B 35/04 |
| | | | | 182/36 |
| 2010/0231402 | A1* | 9/2010 | Flynt | G08B 19/00 |
| | | | | 340/679 |
| 2011/0047764 | A1* | 3/2011 | Strasser | F16B 45/021 |
| | | | | 24/599.5 |
| 2012/0102688 | A1* | 5/2012 | Yang | F16B 45/02 |
| | | | | 24/600.1 |
| 2012/0210542 | A1* | 8/2012 | Yang | F16B 21/165 |
| | | | | 24/369 |
| 2013/0025095 | A1* | 1/2013 | Yang | F16B 45/02 |
| | | | | 24/599.5 |
| 2013/0213735 | A1* | 8/2013 | Dehondt | A62B 35/0087 |
| | | | | 24/600.1 |
| 2014/0110956 | A1* | 4/2014 | Lin | B66C 1/36 |
| | | | | 294/82.2 |
| 2016/0107007 | A1* | 4/2016 | Pollard | A62B 35/0075 |
| | | | | 182/3 |
| 2016/0281765 | A1* | 9/2016 | Yang | A62B 35/0037 |
| 2017/0348555 | A1* | 12/2017 | Dehondt | F16B 45/02 |
| 2020/0222732 | A1* | 7/2020 | Rutkowski | A62B 35/0037 |
| 2020/0368563 | A1* | 11/2020 | Nowicki | A62B 35/0037 |
| 2021/0248892 | A1* | 8/2021 | Lee | E04G 21/3276 |
| 2021/0346739 | A1* | 11/2021 | Shaver | A62B 35/0075 |

\* cited by examiner

STRUCTURE CLIMBING SAFETY DEVICE

CROSS REFERENCES TO RELATED APPLICATIONS

U.S. Provisional Application for Patent Ser. No. 62/684,783, filed Jun. 14, 2018, with title "Tower Climbing Safety Device" which is hereby incorporated by reference. Applicant claims priority pursuant to 35 U.S.C. Par. 119(e)(i).

Statement as to Rights to inventions made under federally sponsored research and development: Not applicable.

BACKGROUND OF THE INVENTION

1. Field of the Invention

The present invention relates generally to safety devices for climbers of tall structures such as a tower requiring vertical or near vertical climbing of a person. More specifically, the present invention relates to a new and useful safety harness for providing support to the climber during ascent and descent of the tall structure.

2. Background Information

Due to the imposition of laws and regulations regarding the protection of workers from falling off of elevated structures, companies in the relevant industry are faced with the task of providing protection for their workers on these elevated structures. At present, there is a multitude of towers, each of which may range from seventy-five (75) feet to one thousand five hundred (1,500) feet in height or taller. In order to reach various locations on the tower, the worker typically climbs the tower using the "free climbing" technique, i.e., the worker climbs up the tower using structural features of the tower itself for foot support. This action obviously exposes the workers to severe injuries or death if they should fall.

Thus, a need presently exists for a system which is low in cost and easy to use in application, that does not impede the worker's actions and/or movements, and that will protect the worker on the tower from a fall.

SUMMARY OF THE INVENTION

The present invention is a safety device that is particularly useful for assisting a climber in climbing tall structures such as a tower. The safety device includes a support harness that is worn by the worker and includes a pair of safety cables that can be releasably attached to the structure. Each end of the safety cables are provided with a snap hook designed to releasably connect to the structure.

In application, the safety harness is worn by the worker and as the worker ascends or descends the structure, the worker continuously releases and then connects one of the snap hooks to the structure such that at least one safety cable is connected to the structure at all times. This method provides constant protection from falls as the worker is continuously tethered from the structure.

The safety harness includes at least one sensor configured for attachment to each snap hook. The sensor for detecting whether the worker is ascending or descending the structure. When either ascending or descending, preferably a second sensor for detecting whether at least one of the snap hooks are connected to the structure as described. In the event the worker is either ascending or descending and neither of the snap hooks are connected to the structure, the device may signal the worker, for example an alarm, in order to notify the worker that a safety hazard exists.

DESCRIPTION OF THE PREFERRED EMBODIMENTS

Figure 1:
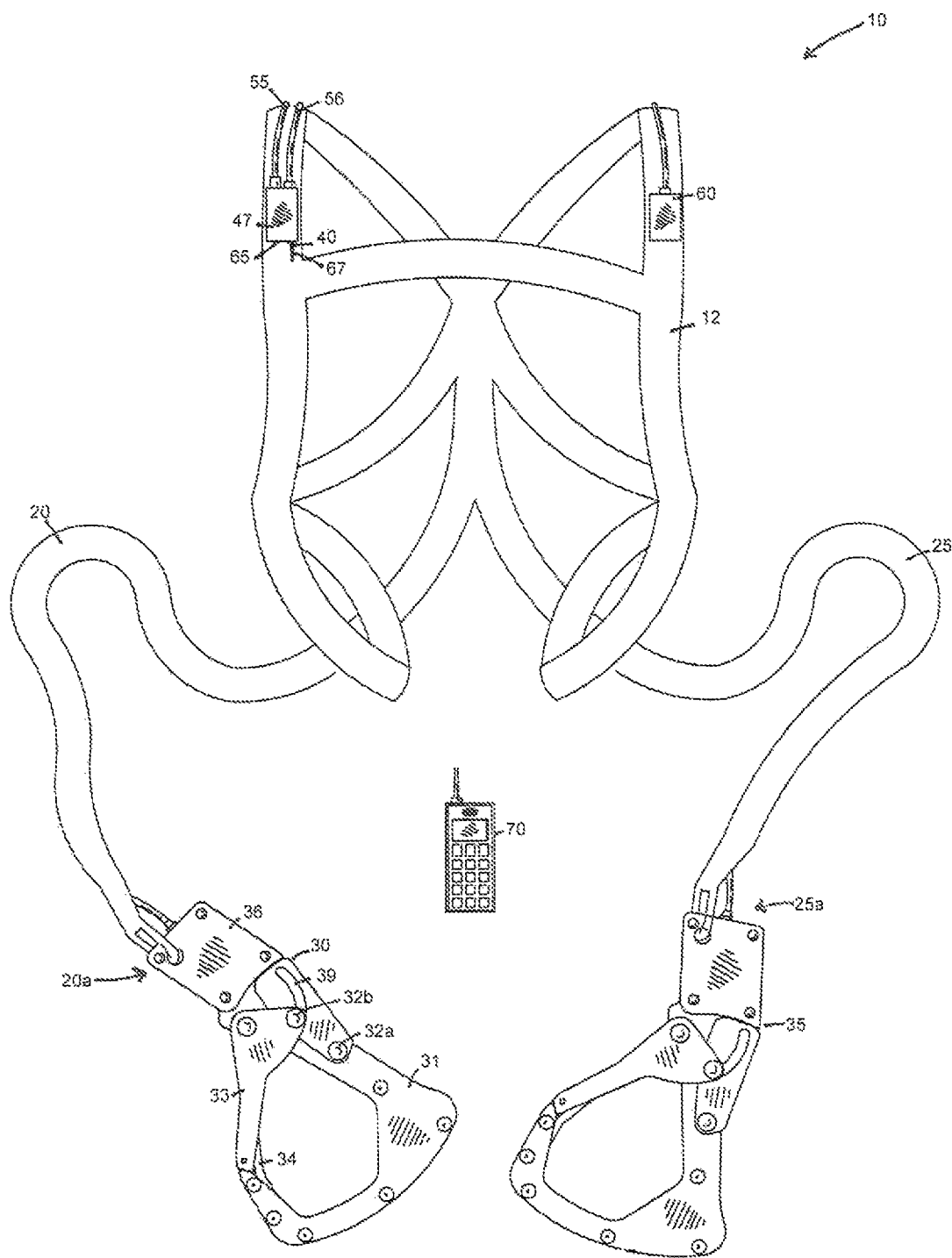
FIG. 1 is a front view of the preferred embodiment of the present invention, a structure climbing safety device.
Figure 2:
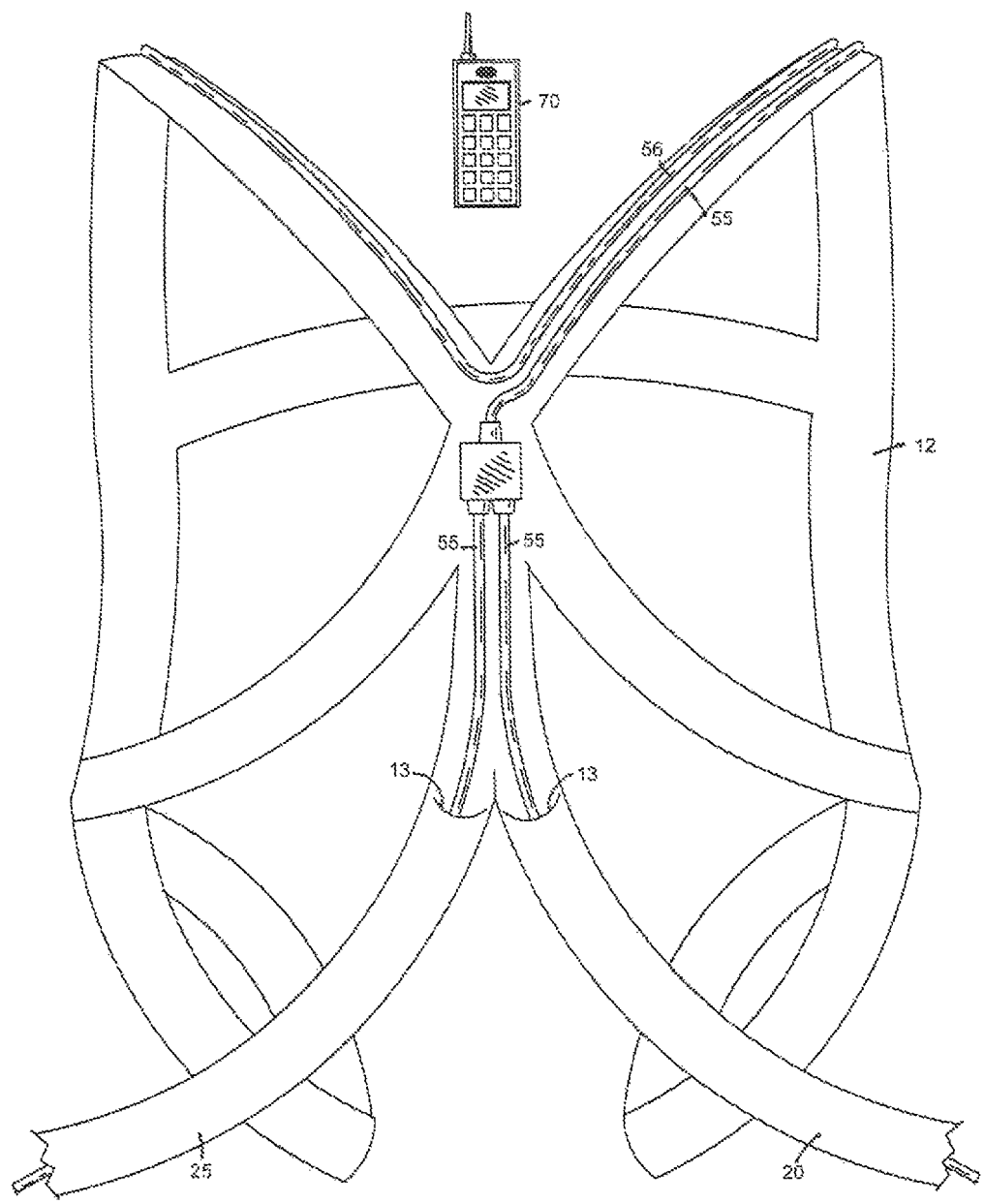
FIG. 2 is a rear view of the support harness shown in FIG. 1.
Figure 3:
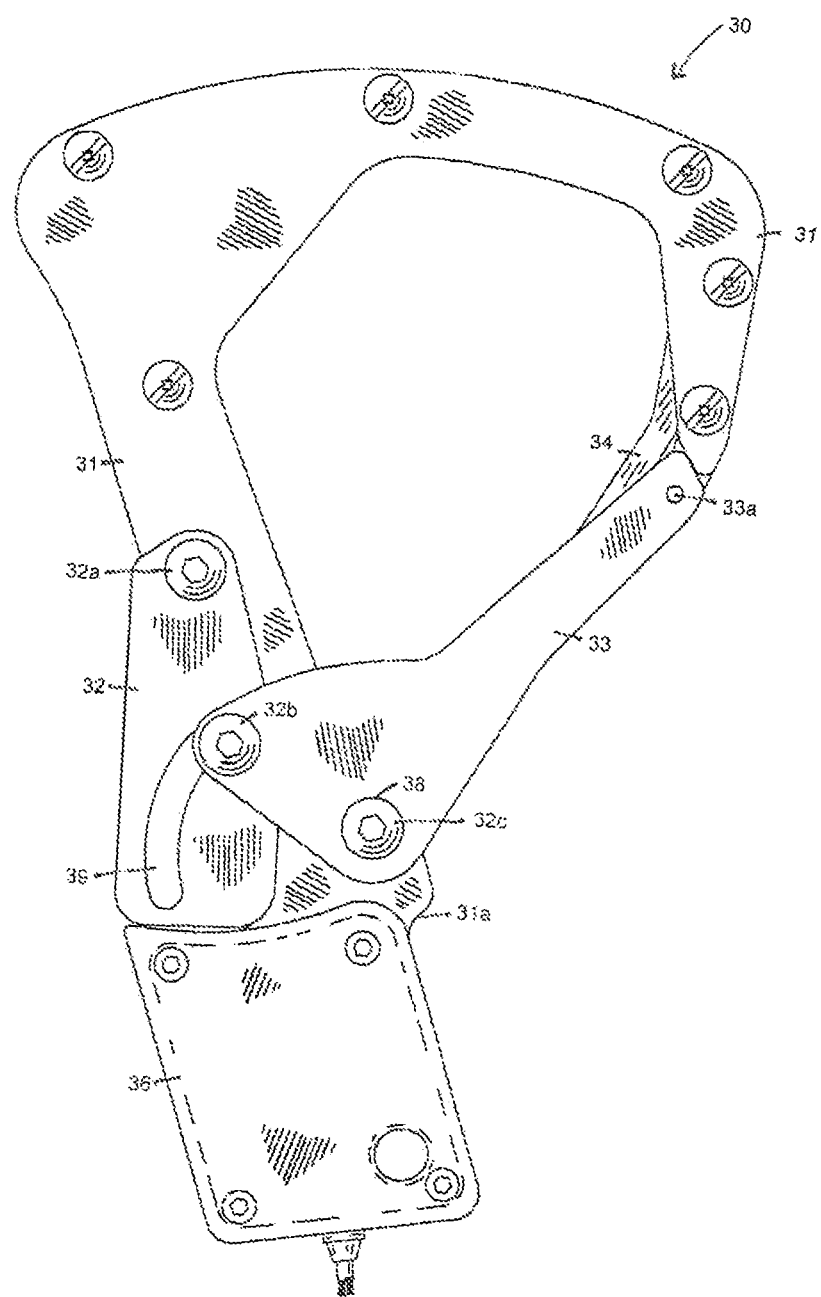
FIG. 3 is a first side view of the snap hook.
Figure 4:
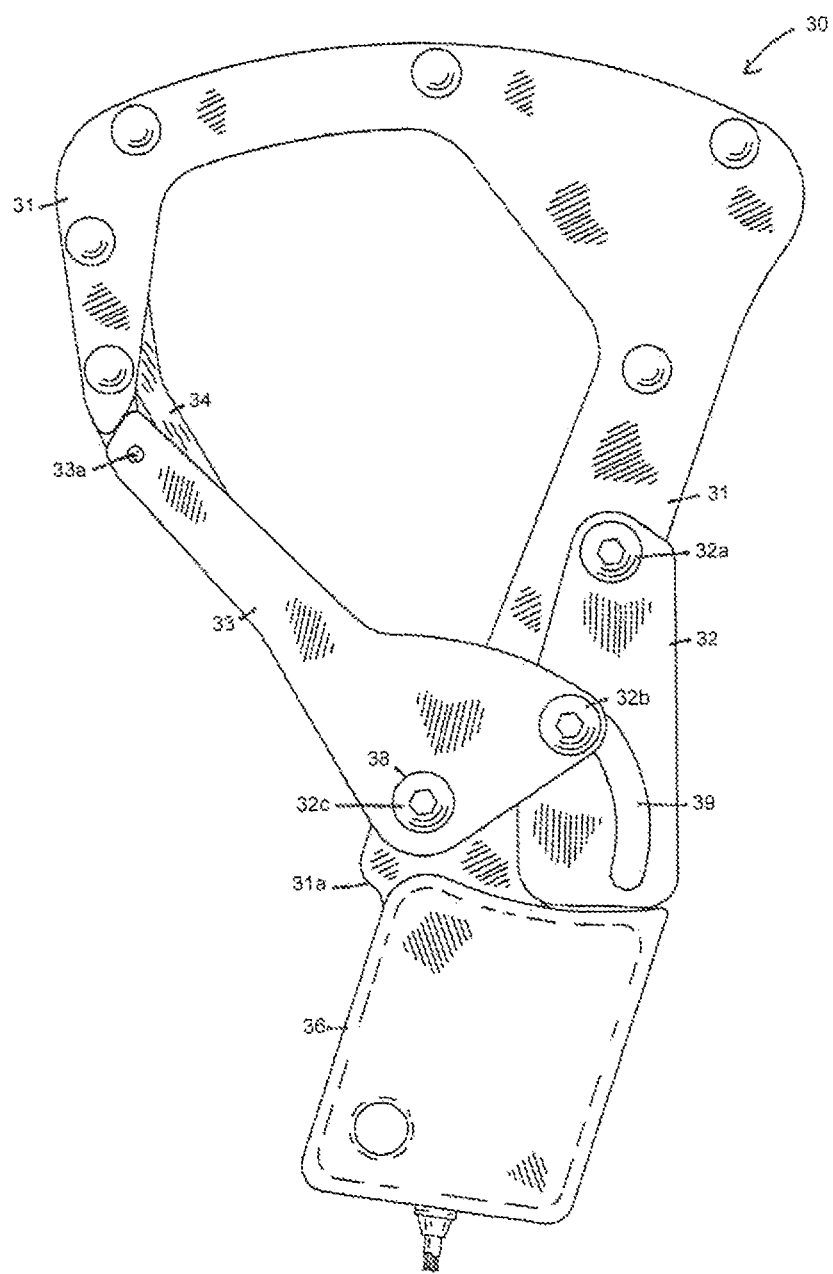
FIG. 4 is a second, opposite side view of the snap hook.
Figure 5:
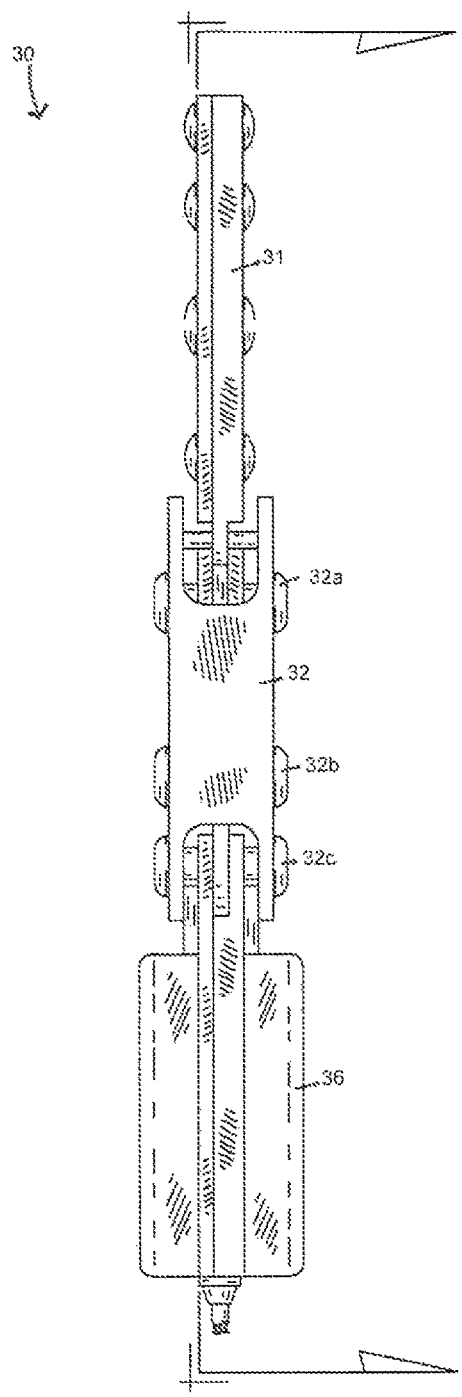
FIG. 5 is a side view of the snap hook with arrows for section view of FIGS. 6-8.

The device of the present invention is directed to a safety device that is used when climbing structures such as a cell tower. The safety device includes a support harness that is worn by the worker and is in cooperation with a pair of safety cables that can be releasably attached to the structure. The present invention was developed to at all times secure the worker to the structure being climbed while not interfering with the worker's motion and work activities. As will be described, the safety device as disclosed consists of components configured and correlated with respect to each other so as to attain the desired objective.

"Structure" as used herein, is in reference to an elevated structure that workers ascend and descend during construction and/or application. The tower, being of conventional construction, and may include a plurality of vertically oriented legs supported by crossbars that often provides the foot support for the climber.

In accordance with a preferred embodiment of this invention, the safety device of the present invention generally designated as numeral 10 comprises a safety harness 12 that may comprise of a chest strap, abdomen straps, and leg straps, or may be configured to be worn as a vest above the worker's waist (not shown), or as a strap to be worn around the worker's waist (not shown). The harness 12 includes pair of safety cables 20,25 having a distal end 20A, 25A adapted to releasably connect to the structure.

The safety harness 12 is preferably constructed of a sturdy nylon woven fabric belting but may also be constructed of leather or any other suitable synthetic material.

The pair of safety cables 20, 25 are of the same construction and may be constructed of a woven nylon rope of known construction for towing or the like. Each end of the safety cables are further provided with a snap hook 30, 35 designed to releasably connect to the structure.

Each snap hook 30 is arranged to be flexed from its normal or "closed" position to a flexed or "open" position and then to flex back to the closed position. This enables the safety cable to be connected to the structure and then naturally flex back to its closed position.

It is to be understood that the snap hook attached to safety cable 25 is identically constructed, having the same embodiments as snap hook 30, except that the embodiments of the snap hook 35 may be a mirror image of the snap hook 30 that will be further described below.

As best illustrated in FIGS. 3-8, snap hook 30 has an arm member 31, and a cam plate 32 pivotally attached 32a to the arm member 31 and first and second lever arms 33, 34 that work together with arm member 31. An end 31a of the arm member 31 is connected to a housing 36 that is rigidly connected to the end of the safety cable.

Figure 6:
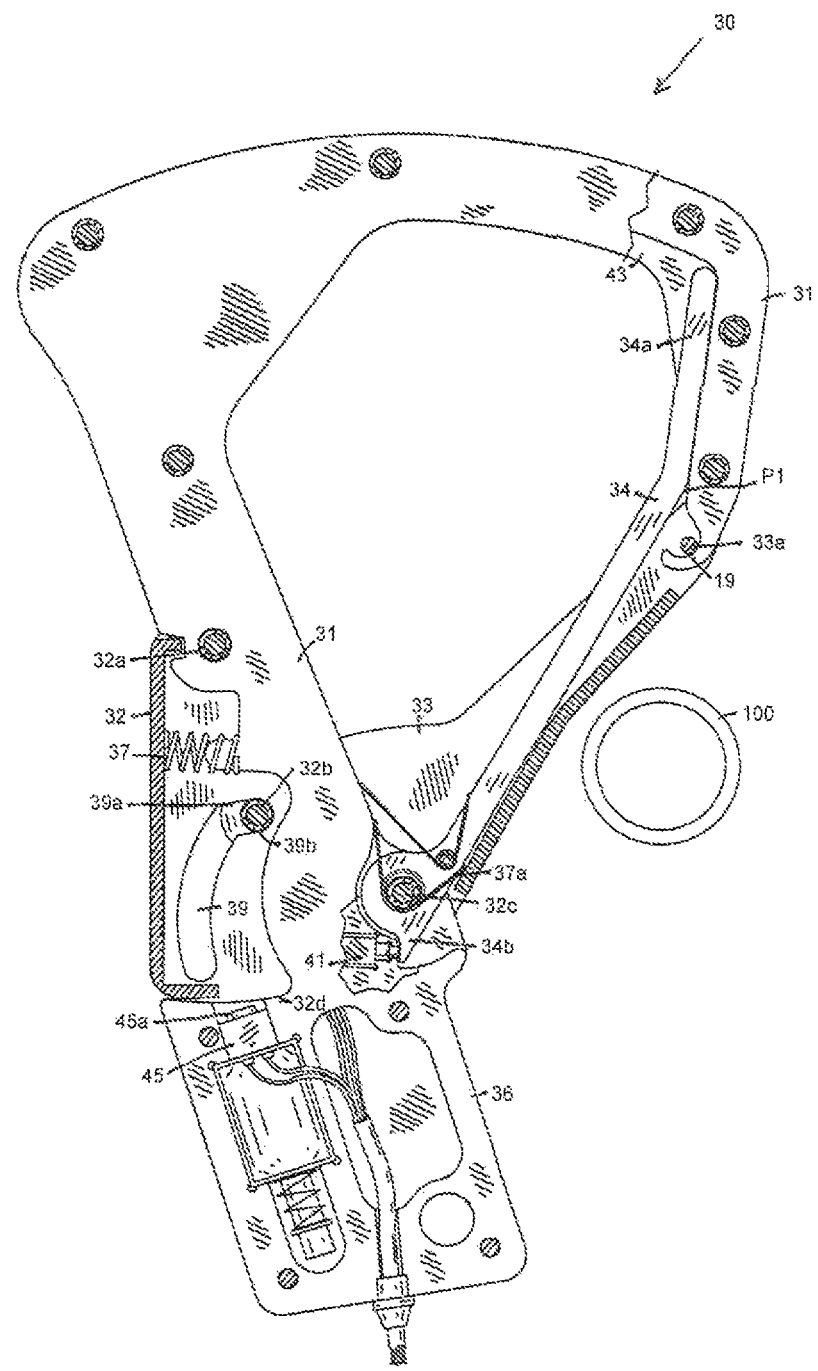
FIG. 6 is a section view illustrating the snap hook in the closed position.

The cam plate 32 is mounted to the arm member 31 for pivotal movement of the first and second lever arms 33, 34 between an unlocked/open position (shown in FIG. 7) and a closed position (see FIG. 6). The cam plate 32 selectively releases a post 32b that allows relative movement of the first and second lever arms 33, 34 to the open/unlocked position.

The cam plate 32 is biased toward the locked position by spring 37 carried on arm member 31 that acts on the first and second lever arms 33,34. Spring 37a is in communications with the arms 33, 34 and to the post 32c. In particular, the post 32c is mounted in a hole 38 in the arm member 31 and extends into engagement with the lever arms 33, 34. The spring 37a and post 32b may cooperate to limit the pivot range of first lever arm 33 to the arc segment 39 disposed in cam plate 32.

Figure 8:
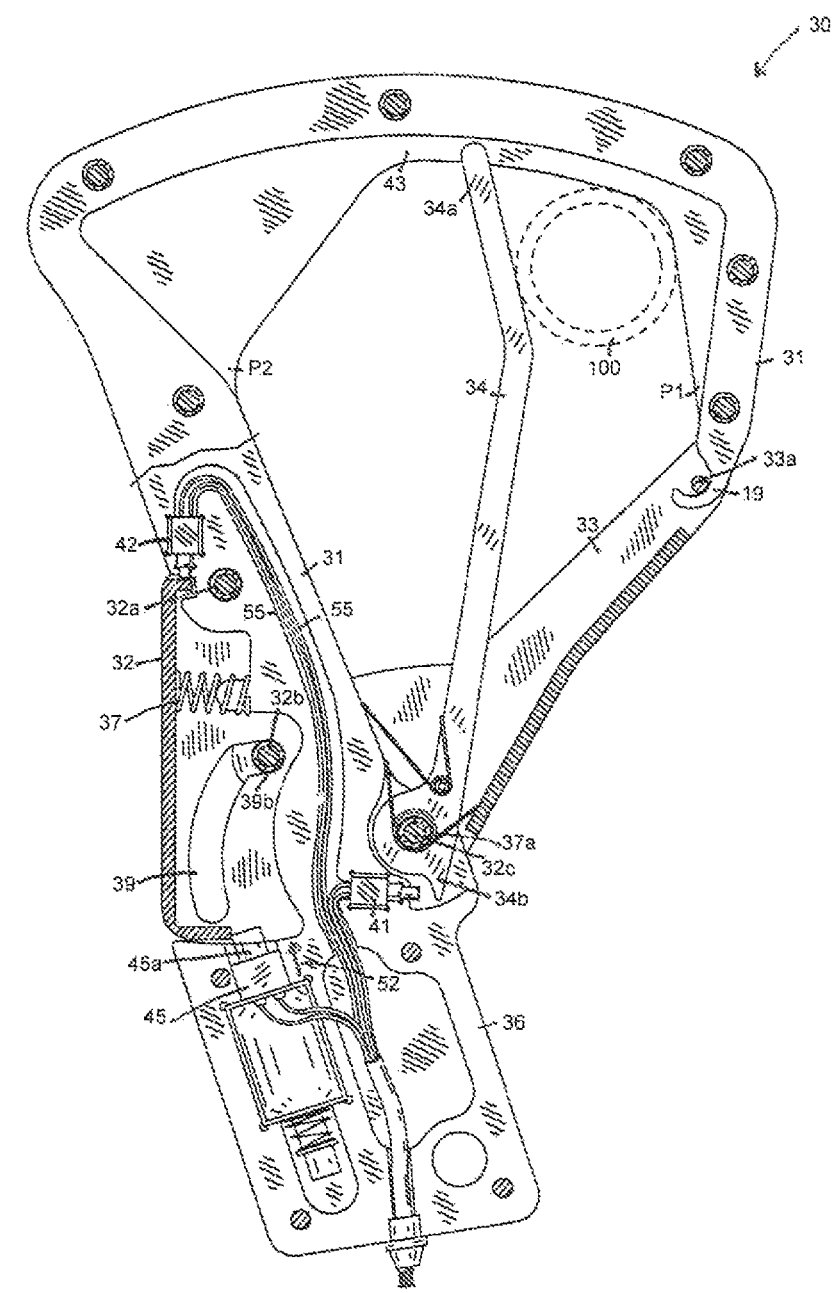
FIG. 8 is a section view illustrating the snap hook in a closed and locked position.

As best illustrated in FIGS. 6 and 8 in the closed position, a lip 19 formed on an end of the arm member 31 catches a safety pin 33a disposed on an end of the first lever arm 33 to prevent movement.

An end 39a of the arc segment 39 advantageously provides a notch 39b for receipt of post 32b that passes through the cam plate 32 and arm member 31. The notch 39b is configured to catch the post 32b when in the closed position and to release the post 32b when in the unlocked position so that the post 32b can travel within the arc segment 39 when in the unlocked position as disclosed. The combination of the notch 39b catching the post 32b provides further safety that the safety hook will remain in the closed position until the cam plate 32 is manually urged inward to release the post 32b from the notch 39b thereby freeing the post 32b to travel along the arc segment 39.

As illustrated, the arm portion 31 further defines an inner passage 43 that extends from a point P1 adjacent the lip 19 to a point P2 approximately opposite point P1. The inner passage 43 is sized to slidingly receive an end 34a of the second lever arm 34. As further illustrated, the end 34a is approximately adjacent point P2 when in the unlocked/open position (see FIG. 7) and can travel as far as point P1 when in the closed position (see FIG. 6).

Figure 7:
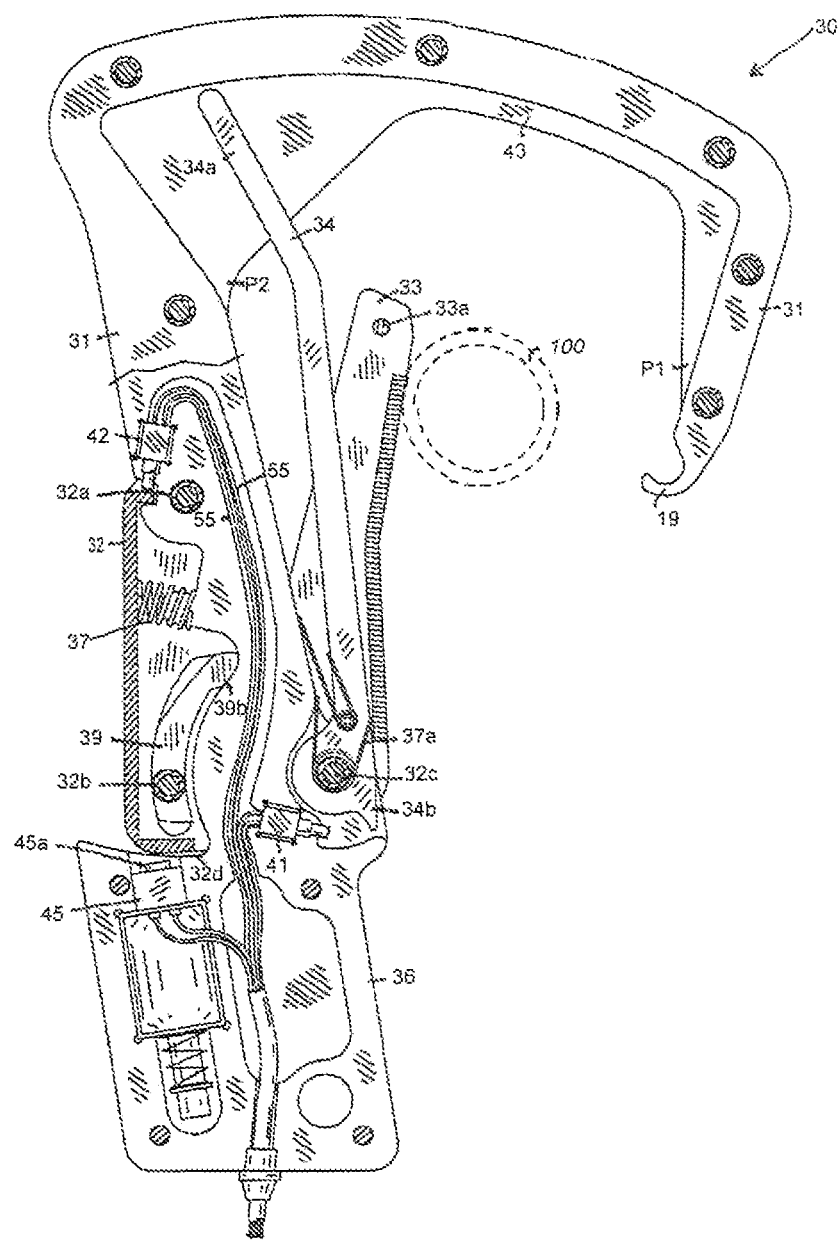
FIG. 7 is a section view illustrating the snap hook in an open position.

During operation of the snap hook, to move to the open/unlocked position in order to receive a prior art tower pole 100 for example, cam plate 32 is manually pushed inward, toward post 32b. Note that when cam plate 32 is pushed toward post 32b, post 32b is released from notch 39b to travel within arc segment 39, allowing the worker to manually urging the first and second lever arms 33, 34 to a raised position as shown in FIG. 7, opening the snap hook. Once the tower pole 100 is received in the opened hook (see FIG. 8), releasing the levers 33, 34 results in the levers moving to the closed position until the first lever arm 33 catches within the safety pin 33a of the lip 19 formed in the arm member 31. You will further note that the second lever arm 34 travels along the inner passage 43 of the arm member 31 until the second arm member 34 contacts the tower pole 100. At this point the tower pole 100 is contained between the arm member 31 and second lever arm 34 to prevent movement of the pole 100.

In order to satisfy the high safety standards or safety provisions previously discussed, for a structure climbing safety device in regard to improper or unsafe use while climbing tall structures, the structure climbing safety device is assigned an actuator 45, which is controlled by a control unit 47 and drives a blocking element 45a that stops the releasing action of the cam plate 32 on post 32b upon predetermined conditions, for example, when the cam plate 32 on one snap hook is being manually released to open while the second snap hook is already in the open position thus the workers attempting to climb the structure with both snap hooks in the open position, an unsafe condition.

Control unit 47 receives information on whether the worker is ascending or descending the structure, and whether each snap hook 30 is in the locked or unlocked position while climbing. Said information is provided by sensor units 40, 41, 42. Thus, whether or not the climber is ascending or descending a structure can be determined, for example, by sensor unit 40 preferably disposed on the safety harness 12, and be provided to control unit 47. Detecting whether at least one of the snap hooks 30 is connected to the structure while the worker is ascending or descending the structure can be determined, for example, by sensor unit 41 disposed on each snap hook 30. And, detecting whether the worker is attempting to open one of the snap hooks can be determined, for example, by sensor 42.

In particular, sensor unit 41 is arranged adjacent the tip 34b of second lever arm 34 for detecting the current location of the second lever arm and whether the snap hook is in the open or closed position. And, sensor unit 42 is arranged adjacent the cam plate 32 for determining whether the worker is attempting to urge the cam plate 32 inward in order to open one of the snap hooks.

With consideration of the provided information, when necessary, control unit 47 generates a control signal for the actuator 45. Actuator 45 according to an advantageous embodiment is configured to activate the axially moveable blocking element 45a.

Supposing that for example, it is determined that the worker is ascending the structure and has climbed a threshold value or predetermined height, three (3) feet for example, detected by sensor unit 40 thereby activating the safety device, and a corresponding signal is transmitted to control unit 47. And, thereafter, sensor unit 42 detects the worker attempting to open one of the snap hooks while the second snap hook is in the open position, a corresponding signal is transmitted to control unit 47. Subsequently, control unit 47 generates the control signal for actuator 45 in terms of stopping the releasing action of the cam plate 32 on post 32b for the snap hook the worker is attempting to open.

In this respect, according to FIG. 8, blocking element 45a of actuator 45 is moved according to arrow 52 in the direction toward cam plate 32 until the free end of blocking element 45a comes into contact with end 32d of cam plate 32. Cam plate 32 is thus locked in position where the post 32b is prevented from releasing and traveling within arc segment 39 to the unlocked position, maintaining the snap hook in the closed and locked position.

The control unit 47 may be connected to the sensors 41 and 42 by line 55 which may extend through a cavity 13 disposed on the rear side of the safety harness. Although the sensors 41 and 42 are shown as being provided with a wired connection to control unit 47, the harness may include a transmitter (not shown) for a wireless connection between the control unit 47 and sensors.

As illustrated, the safety harness may further include a power supply 60, such as a battery pack known in the art, that is appropriately wired 56 to the control unit 47.

As further illustrated, the actuator 45 is maintained within the housing 36 such that the blocking element 45a can communicate with the cam plate 32 as previously described.

In application, when the first hook 30 is attached to the structure, it will lock such that the blocking element 45a is in contact with the cam plate 32 as described (see FIG. 8). As the second hook is attached, both hooks will remain in the closed position but will unlock (see for example FIG. 6). However again, in the event that only one hook is attached, it will be in the locked position as described.

In order to inform the worker of any actuation of the safety device, the system is further assigned an optical and/or acoustic signal generator 65 which is activitable during an actuation. Preferably, the system includes a first alarm to activate in the event of predetermined conditions, and a second alarm in the event of predetermined conditions. For example, the first alarm may signal the worker with an optical and/or acoustic signal when the climber attempts to unhook or place both snap hooks in the open position while climbing, when the climber fails to utilize the snap hooks when the climber has ascended a predetermined distance, or when the unit disconnects. The secondary alarm may activate for example when the worker has traveled a predetermined distance without cycling hooks.

The actuator may further include a transmitter 67 that is in communication with a ground monitor 70, such that all information transmitted between the control unit 47 and sensors 40, 41, 42 will also be received by the ground unit 70, as well as corresponding signals transmitted from the control unit 47 and actuator 45.

In application, the safety harness 12 is worn by the worker (not shown) and pulled taut as described. The worker ascends the structure as is known, and as he moves up the structure, the worker continuously releases and then connects one of the snap hooks to the structure such that at least one safety cable is connected to the structure at all times. Similarly, when the worker descends from the structure, the above procedure is repeated and reversed. This method provides constant protection from falls as the worker is continuously tethered from the structure.

As should be understood, once the safety cable has been secured in place on the structure as described, the worker may then ascend or descend from the structure to perform any work needed to be conducted, without interference by the system and all the while being protected from a fall by the safety device.

Operation of the described sensor is well understood by those skilled in sensor design and methods.

All the embodiments discussed above discloses the safety harness 12 having a pair of safety cables 20, 25. However, it should be understood that for some applications in the field, where the worker is not climbing the structure but is stationary at a given height for example, only a single cable is required. In such case it is anticipated the single cable will include a single snap hook having all the embodiments described above without the need for the described sensor 41, i.e., the sensor used for detecting whether one of two snap hooks is connected to the structure. In the case of a single snap hook application, the control unit is configured such that the snap hook won't release and therefore remains locked once the worker has ascended a selected height, six (6) feet for example.

Figure 9:
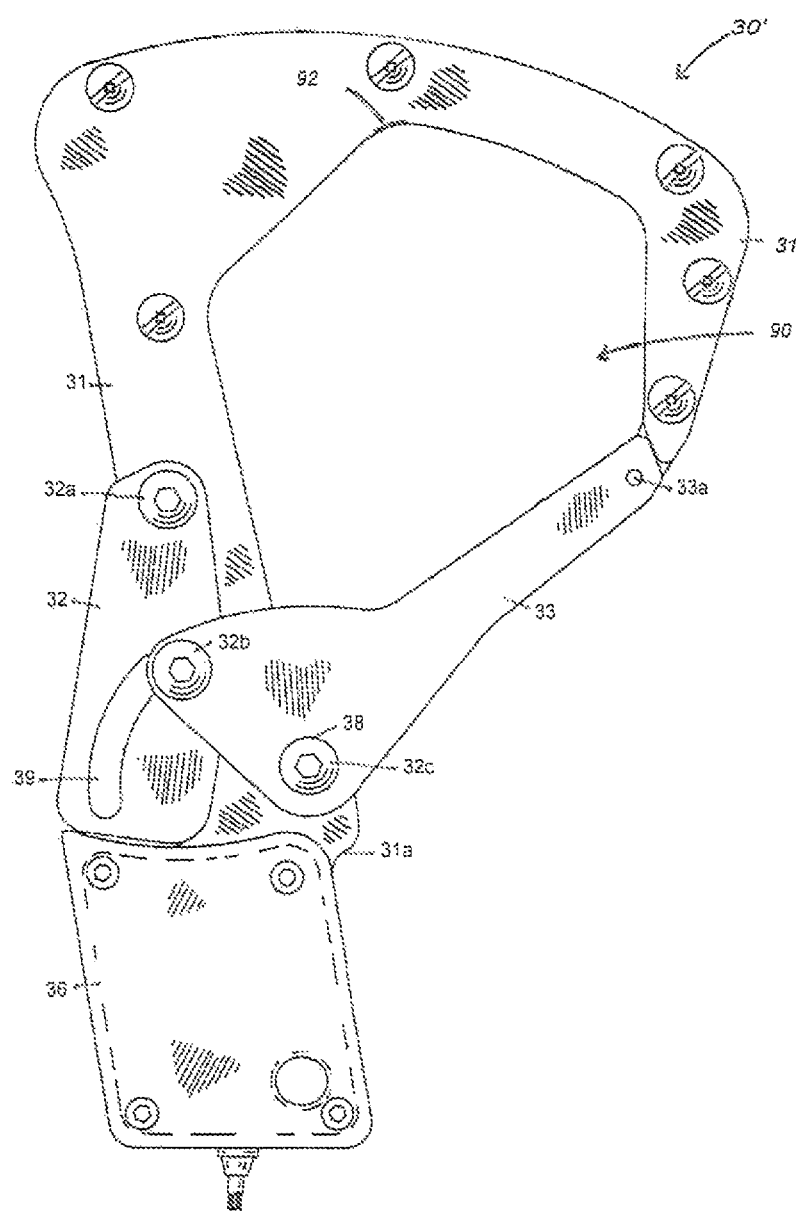
FIG. 9 is a first side view of a second embodiment of the snap hook.

FIG. 9 discloses a second embodiment of a snap hook designated as numeral 30'. As illustrated, the snap hook 30' includes all the embodiments discussed above except for a second lever arm. As illustrated, the snap 30' includes the arm member designated as number 31, the first lever arm 33, the cam plate 32 and housing 36. Again, the snap hook in FIG. 9 includes all the embodiments and mechanically functions (opens and closes and locks) according to the above description.

FIG. 9 further shows a receiving area designated as numeral 90. The receiving area 90 (as best illustrated in FIG. 8) being where the snap hook receives and locks onto the tower pole 100 for example.

As previously disclosed, control unit 47 receives information on the activity of the worker from sensor units. Whether or not the climber is ascending or descending a structure can be determined, for example, by sensor unit 40 preferably disposed on the safety harness 12. Detecting whether the worker is attempting to open one of the snap hooks can be determined, for example, by sensor 42. As illustrated, the snap hook 30' includes at least one detection or proximity sensor 92 arranged adjacent the receiving area 90 for detecting when an object such as the receiving pole 100 is received within the receiving area 90.

Control unit 47 receives information from the at least one proximity sensor 92 when an object is received within the receiving area 90. When an object is detected in the receiving area 90, the control unit 47 generates a control signal for the actuator 45. Actuator 45 according to an advantageous embodiment is configured to activate the axially moveable blocking element 45a. In this respect, blocking element 45a of the actuator 45 is moved in the direction toward cam plate 32 until the free end of blocking element 45a comes into contact with end 32d of the cam plate 32. Cam plate 32 is thus locked in position where the post 32b is prevented from releasing and traveling within arc segment 39 to the unlocked position, maintaining the snap hook in the closed and locked position.

The proximity sensor 92 technology is known in the art. Examples of the several kinds of suitable proximity sensors include ultrasonic sensors, light sensor, touch sensor, and the like.

Although the description above contains many specificities, these should not be construed as limiting the scope of the invention but is merely providing illustrations of some of the presently preferred embodiments of this invention.

As such, it is to be understood that the present invention is not limited to the embodiments described above, but encompasses any and all embodiments within the scope of the claims.

It would be obvious to those skilled in the art that modifications may be made to the embodiments described above without departing from the scope of the present invention. Thus the scope of the invention should be determined by the appended claims in the formal application and their legal equivalence, rather than by the examples given.

I claim:

1. A structure climbing safety device comprising:
   a safety harness that includes first and second safety cables, each said first and second safety cables includes a snap hook designed to releasably connect to
   a structure;
   a control unit;
   said snap hook comprising:
   an arm member,
   a cam plate,
   first and second lever arms,
   wherein said cam plate is mounted to said arm member for pivotal movement of the first and second lever arms between an open/unlocked position and a closed position, and wherein said cam plate is configured to selectively release a first post that allows relative movement of the first and second lever arms to the open/unlocked position, a first spring member in communications with the first and second lever arms and to a second post that extends through said arm member into engagement with said first and second lever arms, and wherein a second spring member and said first post cooperate to limit a pivot range of said first lever arm to an arc segment disposed in said cam plate, said arm member defines a lip configured to catch a safety pin disposed on an end of the first lever arm, and wherein an end of said arc segment defines a notch for receipt of said first post, said notch is configured to catch said first post when said device is in the closed position and to release said first post when in the open/unlocked position so that said first post can travel within said arc segment, said arm member further defines an inner passage sized to slidingly receive an end of said second lever arm, and an actuator that is controlled by said control unit and drives a blocking element that stops a releasing action of said cam plate on said first post;

and wherein said control unit receives information from first, second and third sensor units, said first sensor unit configured to detect when a worker is ascending or descending the structure, said second sensor configured to detect whether said snap hook is in the open or closed position, and said third sensor configured to detect when the worker is attempting to open the snap hook;

a power supply electrically connected to said control unit; and a signal generator connected to said control unit that includes at least one alarm, and wherein said second sensor unit is arranged adjacent a tip end of said second lever arm for detecting a current position of said second lever arm and whether the snap hook is in the open or closed position.

2. The safety device of claim 1, wherein said cam plate is biased towards a locked position by said spring member carried in said first lever arm.

3. The safety device of claim 2, wherein said actuator is disposed within a housing such that said blocking element can communicate with said cam plate.

4. The safety device of claim 3, wherein said actuator further includes a transmitter that is in communication with a ground monitor.

5. A structure climbing safety device comprising:
a safety harness that includes a safety cable with a snap hook designed to
releasably connect to a structure;
a control unit;
said snap hook comprising:
an arm member,
a cam plate pivotally mounted to said arm member,
first and second lever arms,
wherein said cam plate is configured to selectively release a first post that allows relative movement of the first and second lever arms,
a spring member and said first post cooperate to limit a pivot range of said first lever arm to an arc segment disposed in said cam plate,
said arm member defines a lip configured to catch a safety pin disposed on an end of the first lever arm,
and wherein an end of said arc segment defines a notch for receipt of said first post, said notch is configured to catch said first post when said device is in a closed position and to release said first post to travel within said arc segment, said arm member further defines an inner passage sized to slidingly receive an end of said second lever arm, and an actuator that is controlled by said control unit and drives a blocking element that stops a releasing action of said cam plate on said first post;

and wherein said control unit receives information from a first sensor unit configured to detect when a worker is ascending or descending the structure and a second sensor unit configured to detect when a worker is attempting to open the snap hook;

a power supply electrically connected to said control unit; and a signal generator connected to said control unit that includes at least one alarm.

6. The safety device of claim 5, wherein said cam plate is biased towards a closed position by said spring member.

7. The safety device of claim 6, wherein said actuator is disposed within a housing such that said blocking element can communicate with said cam plate.

8. The safety device of claim 7, wherein said actuator further includes a transmitter that is in communication with a ground monitor.

9. The safety device of claim 8, and wherein said safety harness further includes a second safety cable with a second snap hook.

10. The safety device of claim 9, wherein said first and second snap hooks each include a third sensor configured to determine when said device is in an open or closed position.

11. The safety device of claim 9, wherein said third sensor is in communication with said control unit.

12. The safety device of claim 11, wherein said third sensor is arranged adjacent a tip of said second lever arm for detecting a current location of said second lever arm and whether said first or second hooks are in the open or closed position.

13. A structure climbing safety device comprising:
a safety harness that includes at least one safety cable with a snap hook designed to releasably connect to a structure;
a control unit;
said snap hook comprising:
an arm member,
a cam plate pivotally mounted to said arm member, said cam plate including a first post,
a lever arm,
a spring member and said first post cooperate to limit a pivot range of said lever arm to an arc segment disposed in said cam plate,
said arm member defines a lip configured to catch a safety pin disposed on an end of the lever arm,
and wherein said arc segment defines a notch for receipt of said first post, said notch is configured to catch said first post when said device is in a closed position and to release said first post to travel within said arc segment,
an actuator that is controlled by said control unit and drives a blocking element that stops a releasing action of said cam plate on said first post;
and wherein said control unit receives information from a first sensor unit configured to detect when a worker is ascending or descending the structure, a second sensor unit configured to detect when a worker is attempting to open the snap hook and a third sensor configured to determine when an object is received within a receiving area of said snap hook;

a power supply electrically connected to said control unit; and a signal generator connected to said control unit that includes at least one alarm.

14. The safety device of claim 13, wherein said cam plate is biased towards a closed position by said spring member.

15. The safety device of claim 14, wherein said actuator is disposed within a housing such that said blocking element can communicate with said cam plate.

16. The safety device of claim 15, wherein said actuator further includes a transmitter that is in communication with a ground monitor.

17. The safety device of claim 16, wherein said third sensor is a proximity sensor.

* * * * *